Inventor
Charles H. Easley

Feb. 28, 1950

C. H. EASLEY 2,498,663

COMBINATION LUGGAGE CARRIER, TANDEM SEAT, AND BASKET

Filed May 8, 1947

Inventor
Charles H. Easley

By *Clarence A. O'Brien
and Harvey B. Jacobson*
Attorneys

Patented Feb. 28, 1950

2,498,663

UNITED STATES PATENT OFFICE 2,498,663

COMBINATION LUGGAGE CARRIER, TANDEM SEAT, AND BASKET

Charles H. Easley, Chula Vista, Calif., assignor of one-half to Gerald R. Easley, Chula Vista, Calif.

Application May 8, 1947, Serial No. 746,725

3 Claims. (Cl. 224—33)

This invention comprises novel and useful improvements in a combination luggage carrier, tandem seat and basket and more specifically pertains to an attachment for use upon bicycles or motorcycles for increasing the utility and carrying capacity of the same.

The principal purposes of this invention are to provide an attachment which shall be of light weight, inexpensive but durable construction, and which may be readily attached to or removed from a bicycle, and which shall increase the carrying capacity of the same.

An additional object of the invention is to provide a device in accordance with the preceding objects which shall be collapsible to form an auxiliary seat or luggage carrier and may be selectively assembled to provide an efficient basket for packages and the like.

A further object of the invention consists in providing a device in accordance with the aforementioned objects wherein novel latching means are provided for selectively retaining the parts in their disassembled or collapsed position and their assembled receptacle forming position.

Yet another object of the invention is to provide an attachment conforming to the above mentioned objects wherein the sides of the receptacle may be utilized to constitute skirts or guards for the rear wheels of a bicycle or motorcycle to which the device may be attached.

Yet another important purpose of the invention resides in providing in a device of the aforementioned characteristics a novel construction of resilient means for selectively urging the parts into either of their two positions of utility.

These, together with various ancillary objects of the invention which will later become apparent as the following description proceeds, are attained by this device, a preferred embodiment of which has been illustrated, by way of example only in the accompanying drawings, wherein.

Referring now more specifically to the annexed drawings, wherein like numerals indicate similar parts throughout the views, 10 designates generally a portion of the rear end of a cycle, which may be a bicycle as shown or a motorcycle if preferred. The attachment, designated generally at 12, is adapted for ready attachment to or removal from the rear frame construction of the bicycle or motorcycle and when so applied is intended to serve a plurality of purposes. In accordance with the invention, the attachment 12 comprises a flat base member 14 and which is provided upon the front and rear portions of the undersurface thereof with depending transversely extending brackets 16 and 18 respectively which are suitably attached as by fastening means 20 to the base member.

Figure 1:
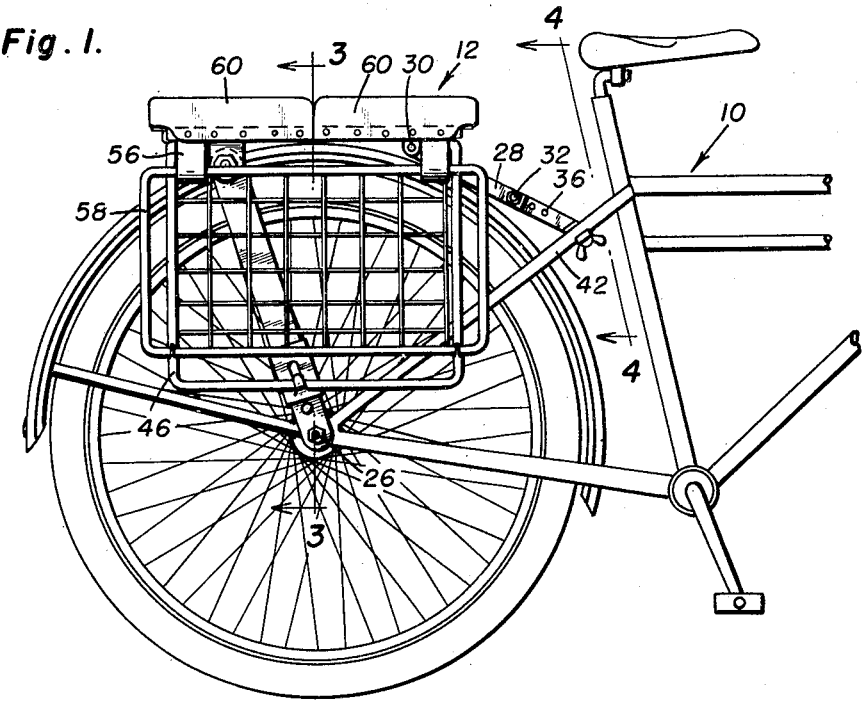
Figure 1 is a side elevational view of a portion of a bicycle showing the attachment of this invention applied thereto, in position to form a luggage carrier.
Figure 2:
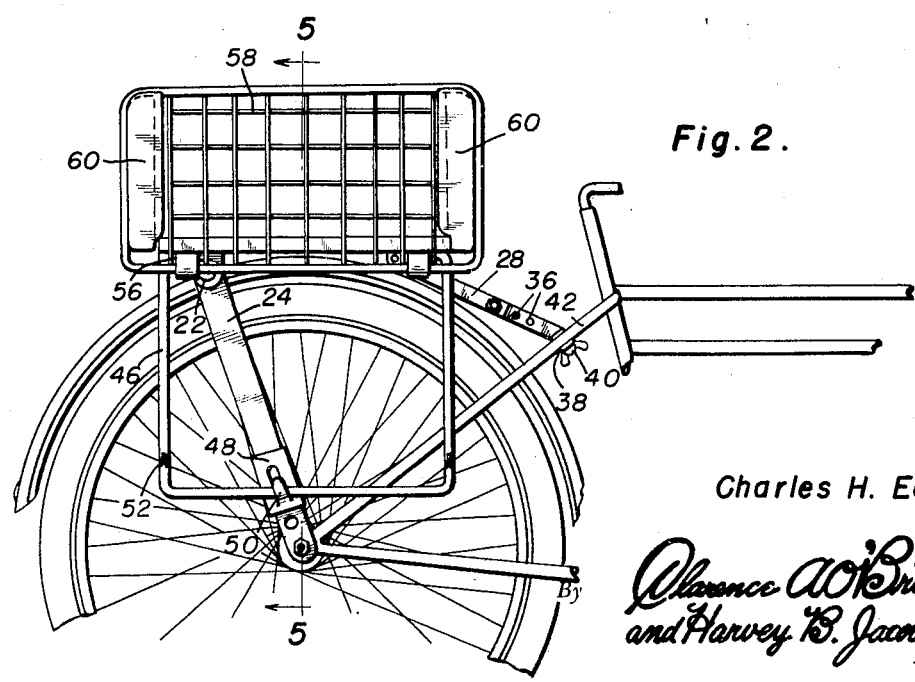
Figure 2 is a view similar to Figure 1 but showing the parts in position to form a basket or receptacle.

From downwardly extending legs of the rear bracket member 18 are pivotally secured as at 22, a pair of leg supports 24 whose lower ends are journalled upon the rear wheel axle 26. The downwardly extending extremities of the front bracket 16 have a pair of links 28 pivotally connected thereto as at 30, the outer extremity of these links being pivotally connected as at 32 to the extremities of a U-shaped yoke or strap member 34. As shown in Figures 1 and 2, the legs of the yoke member are provided with a plurality of apertures 36 by means of which the links 28 may be adjustably pivoted thereto. The central or bight portion of the yoke 34 has a transversely extending clamp 38 secured thereto as by a wing nut fastening means 40. This clamp having semi-circular recesses at its outer extremities for clamping engagement of the tubular frame members of the rear portion of the bicycle 10 and which are shown at 42. As will be evident, the yoke 34 and clamp 38 are secured to these tubular members 42 upon a bicycle or motorcycle as desired, and the base 14 securely and adjustably mounted thereon by means of proper adjustment of the links 28 upon the aperture 36 by the fastening means 32.

Pivotally secured to downwardly extending longitudinally disposed socket members 44 constituting hinges, upon opposite sides of the base 14, are a pair of heavy wire bails or frame members of U-shaped construction, indicated at 46. A sleeve 48 is positioned to frictionally engage and slidably embrace the support members 24, which sleeve is provided with an integrally formed finger 50 which is adapted to be deformed to embrace the lower end of the bail 46 for securing the same in position thereon. The bail 46 and member 48 confer additional rigidity to the assembly in its mounting upon the rear portion of a cycle and serves an additional function to be subsequently set forth.

The downwardly extending legs of the bail 46 are provided adjacent their lower edges with integral upwardly extending brackets or supports 52 for a purpose which will subsequently become apparent.

Figure 3:
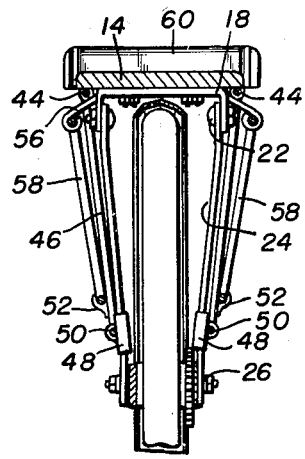
Figure 3 is a fragmentary vertical sectional view taken substantially upon the section line 3—3 of Figure 1 and showing details of construction of the device.
Figure 4:
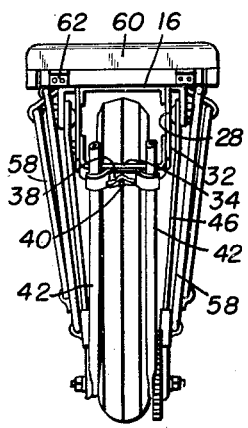
Figure 4 is a fragmentary view taken substantially upon the line 4—4 of Figure 1 and showing in vertical elevation an end view of the attachment.
Figure 5:
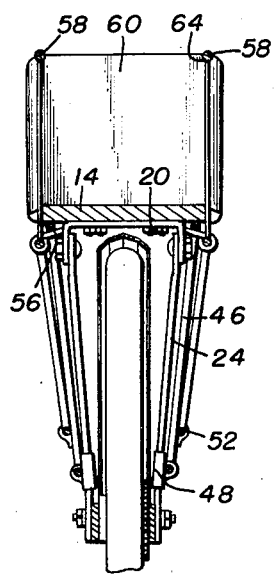
Figure 5 is a fragmentary vertical transverse sectional view taken substantially upon the section line 5—5 of Figure 2 and showing the position of the parts when assembled to form a basket; and, Figure 6 is an enlarged fragmentary perspective view showing the device in assembled position to form a receptacle.
Figure 6:
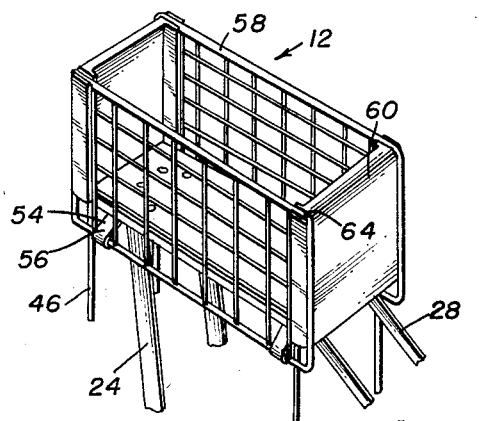

Secured to the undersurface of the base 14 adjacent the front and rear ends thereof, are a pair of transversely disposed leaf spring members 54 whose extremities 56 are angularly bent outwardly and downwardly and have their ends inturned to provide pivotal hinges for receiving in freely oscillatable manner the rim of a rectangular grill member 58. The transversely disposed leaf springs 54 may be secured in any suitable manner to the undersurface of the base 14, and are given a set at their extremities to assume the position with their ends downwardly bent as shown in Figures 3 and 5. A pair of end-plates 60 are hingedly connected as at 62 to the front and rear ends of the base plate 14, in such a manner that they may be elevated as shown in Figure 6 to form the end walls of a receptacle 12, or may be folded inwardly of the receptacle as shown in Figure 1, whereby their external surfaces which are appropriately finished or upholstered, may constitute a tandem seat or luggage carrier for the cycle. It should be particularly noted that the edges of the end walls 60 are curved inwardly at their sides and top to provide a smoothly curved exterior for particularly adapting the ends to form the above mentioned luggage carrier or seat. It should be noted also that the upper edges of the ends 60 are notched adjacent their lateral edges as at 64 to provide a retaining means for the rim of the side rail members 58, whereby the latter may engage and securely lock the pins into their elevated positions as shown in Figure 6.

It should be here noted that the above mentioned leaf spring members 54 serve a dual function in that they normally urge the rim of the grill member 58 downwardly into seating position upon the brackets 52 when the device is assembled to form a luggage carrier or seat as shown in Figure 1, or alternately resiliently urge the grill members downwardly to cause the rim thereof to engage in the notches 64 for locking engagement with the end members when the device is assembled to form a basket or receptacle as shown in Figure 6.

It should be particularly noted that the length of the sides 58 is such that their side walls will snugly embrace the outer surfaces of the end members 60, while their longitudinal rims are engaged in the notches 64 and the entire side or grill member is yieldingly urged downwardly by the leaf spring members 54. Obviously, it is merely necessary for the user to grasp the side members 58 and urge the same upwardly against the opposition of the springs 54, to release the latching engagement of the side members with either the notches 64 of the end members 60, or the supporting brackets 52 of the bail members 46.

It will thus be seen that the side members 58 serve the dual function of constituting a part of the receptacle or basket of the apparatus as well as constituting a shield or guard for the bicycle wheel when the device is collapsed into the tandem seat arrangement.

From the foregoing, it will be obvious that numerous modifications will readily occur to those skilled in the art after a consideration of the accompanying specification and drawings, and accordingly it is not desired to limit the invention to the exact construction shown and described. It is therefore intended that all suitable modifications and equivalents may be resorted to, falling within the scope of the appended claims.

What is claimed as new is as follows:

1. An attachment for bicycles and the like comprising a base, supporting means for mounting said base upon the frame of a cycle, sides and ends pivoted to said base and movable to form a basket, said sides being engageable with said ends in latching engagement, said ends being provided with notches at the upper ends thereof, said sides being engageable with said notches and pivoted upon resilient supports, said sides being resiliently biased to retain the latching engagement with said notches, said supports comprising leaf springs secured transversely upon said base, said sides being pivoted to the extremities of said leaf springs.

2. An attachment for bicycles and the like comprising a base, supporting means for mounting said base upon the frame of a cycle, sides and ends pivoted to said base and movable to form a basket, said sides being engageable with said ends in latching engagement, said ends being provided with notches at the upper ends thereof, said sides being engageable with said notches, said support means including a framework embracing a cycle wheel, brackets on said support, said sides being receivable in said brackets when in their lowered position to form shields for said wheel, resilient means for yieldingly retaining said sides in said bracket, said resilient means including transverse leaf springs secured to said base, said sides being pivoted to the extremities of said leaf springs.

3. An attachment for bicycles and the like comprising a base, supporting means for mounting said base upon the frame of a cycle, sides and ends pivoted to said base and movable to form a basket, notches at the upper ends of said ends, said sides being engageable with said notches to retain said ends in a vertical position, wherein said support means includes a frame work embracing a cycle wheel, brackets on said support, said sides being receivable in said brackets when in their lowered position to form shields for said wheel, said ends being selectively folded inwardly of and upon said base to provide a seat and said sides being selectively lowered to form said shields and means normally urging said sides into seating engagement with said brackets and urging said sides into latching engagement with said notches in said ends, said means including leaf springs secured to said base, said sides being pivoted to the extremities of said leaf springs.

CHARLES H. EASLEY.

REFERENCES CITED

The following references are of record in the file of this patent:

UNITED STATES PATENTS

| Number | Name | Date |
|---|---|---|
| 582,229 | Reynolds | May 11, 1897 |
| 617,685 | Gilbert | Jan. 10, 1899 |
| 1,121,580 | Burkett et al. | Dec. 15, 1914 |
| 1,204,791 | Kyle | Nov. 19, 1916 |
| 1,216,709 | Lowy | Feb. 20, 1917 |
| 1,963,333 | Morales | June 19, 1934 |
| 1,967,506 | Harrison | July 24, 1934 |

FOREIGN PATENTS

| Number | Country | Date |
|---|---|---|
| 288 | Great Britain | July 6, 1909 |
| 17,457 | Great Britain | July 27, 1912 |